United States Patent
Laskin et al.

(10) Patent No.: US 9,285,593 B1
(45) Date of Patent: Mar. 15, 2016

(54) METHOD AND APPARATUS FOR SHAPING FOCUSED LASER BEAMS

(71) Applicant: AdlOptica Optical Systems GmbH, Berlin (DE)

(72) Inventors: Alexander Laskin, Berlin (DE); Vadim Laskin, Berlin (DE)

(73) Assignee: AdlOptica Optical Systems GmbH, Berlin (DE)

( * ) Notice: Subject to any disclaimer, the term of this patent is extended or adjusted under 35 U.S.C. 154(b) by 46 days.

(21) Appl. No.: 14/136,486

(22) Filed: Dec. 20, 2013

(51) Int. Cl.
*G02B 27/09* (2006.01)

(52) U.S. Cl.
CPC .................. *G02B 27/0927* (2013.01)

(58) Field of Classification Search
CPC ............. G02B 3/02; G02B 3/04; G02B 3/06; G02B 5/3083; G02B 5/32; G02B 5/1871; G02B 27/0025; G02B 27/0068; G03F 7/001; G01J 9/00; G01J 2009/002; G01J 2009/004; B23K 26/06; B23K 26/0626; B23K 26/0639–26/0656; B23K 26/073–26/0736; H01S 3/005; H01S 3/0085
USPC ......... 359/558–576, 641, 708–712, 719, 724, 359/726–728; 219/121.73–121.75, 121.7, 219/121.6, 121.61; 372/9, 29.02, 29.023
See application file for complete search history.

(56) References Cited

U.S. PATENT DOCUMENTS

| | | | | |
|---|---|---|---|---|
| 3,476,463 | A | * 11/1969 | Kreuzer | ................. 359/717 |
| 4,444,471 | A | * 4/1984 | Ford et al. | ................. 359/676 |
| 5,300,756 | A | 4/1994 | Cordingley | |
| 5,352,495 | A | * 10/1994 | Henderson et al. | ........ 427/596 |
| 5,864,430 | A | 1/1999 | Dickey et al. | |
| 6,433,301 | B1 | 8/2002 | Dunsky et al. | |
| 6,639,177 | B2 | 10/2003 | Ehrmann et al. | |

(Continued)

OTHER PUBLICATIONS

De Silvestri et al., "Lasers with Super-Gaussian Mirrors," IEEE Journal of Quantum Electronics, vol. 26, No. 9, Sep. 1990, pp. 1500-1509.*

(Continued)

*Primary Examiner* — Stephone B Allen
*Assistant Examiner* — Adam W Booher
(74) *Attorney, Agent, or Firm* — Brian S. Steinberger; Law Offices of Brian S. Steinberger, P.A.

(57) ABSTRACT

Beam shaping methods, systems, devices and apparatus to provide transformation of a $TEM_{00}$ beam which intensity distribution is described by the Gaussian or similar functions to a focused spot of round or square shape with uniform intensity distribution achieved through introducing in the $TEM_{00}$ beam a phase shift function with smooth phase transition and further focusing of the transformed beam; the resulting intensity distributions are created around the focal plane of a focusing optical system. The phase shift function is introduced by a phase transforming optical system implemented in apparatuses of the invention in form of a plate, or a telescope, or a collimator, or integrated to the focusing optical system: the phase transforming optical system including an aspheric optical surface providing the phase shift function with smooth phase transition. As a focusing optical system any diffraction limited optics with positive dioptric power can be applied.

17 Claims, 5 Drawing Sheets

(56) References Cited

U.S. PATENT DOCUMENTS

| | | |
|---|---|---|
| 6,777,645 B2 | 8/2004 | Ehrmann et al. |
| 6,791,060 B2 | 9/2004 | Dunsky et al. |
| 6,975,458 B1 | 12/2005 | Kanzler |
| 6,989,508 B2 | 1/2006 | Ehrmann et al. |
| 7,085,062 B2 | 8/2006 | Hauschild |
| 7,193,791 B2 * | 3/2007 | Hirai et al. .................... 359/707 |
| 8,023,206 B2 * | 9/2011 | Laskin .......................... 359/784 |

OTHER PUBLICATIONS

Kasinski et al., "Near-diffraction-limited laser beam shaping with diamond-turned aspheric optics," Optics Letters, vol. 22, No. 14, Jul. 15, 1997, pp. 1062-1064.*

Haglund, et al., Surface Tension Stabilized Laser Welding (Donut Laser Welding)—A New Laser Welding Technique, 2013, J. Laser Appl., p. 031501-1, vol. 25, No. 3.

\* cited by examiner

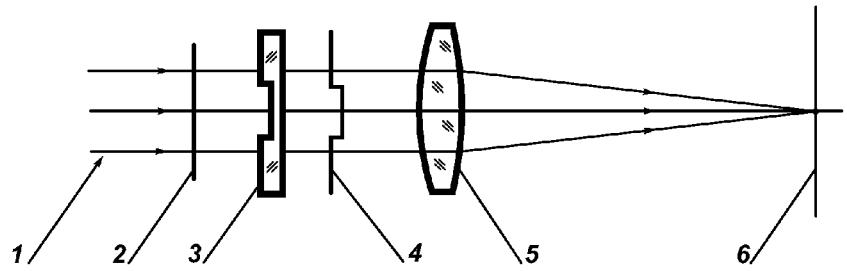
FIG. 3 *(Prior Art)*
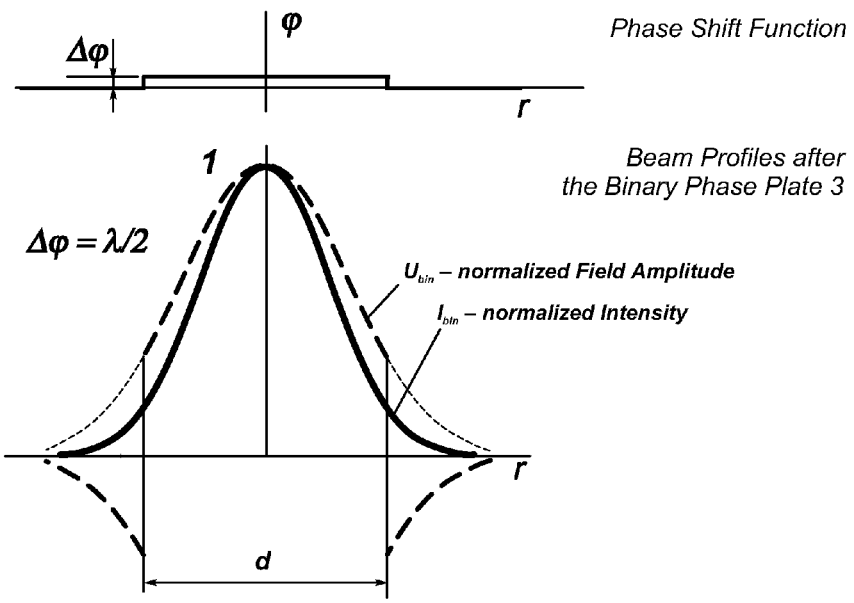
FIG. 4a *(Prior Art)*
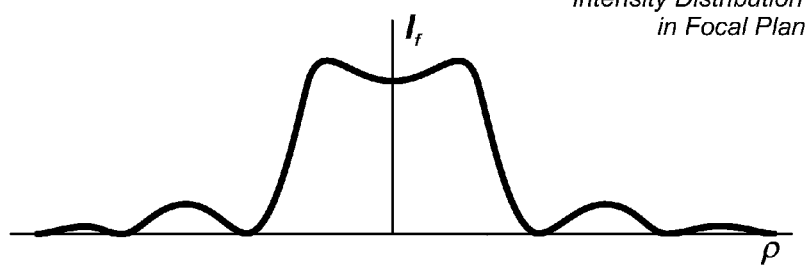
FIG. 4b *(Prior Art)*

*Phase Transforming Optical System*

*Intensity Distribution in Focal Plane 6 of a Focusing Optical System 5*

METHOD AND APPARATUS FOR SHAPING FOCUSED LASER BEAMS

FIELD OF INVENTION

The present invention relates to the field of optics, in particular to optical systems, apparatus, devices and methods for beam shaping being intended to transform intensity distribution of focused laser beams in the focal plane and nearest area.

BACKGROUND TO THE INVENTION

Lasers are widely applied in various applications in industry and their effective using is very important. Due to their physics features of creating the laser radiation the intensity profile of laser sources is described, typically, by the Gaussian function, FIG. 1. When focusing a Gaussian laser beam by a lens the intensity distribution in the focal plane of this lens is described by Gaussian function as well—this is well known feature of $TEM_{00}$ laser beams. This intensity distribution is, also, characteristic one for the planes near the focal plane of a lens, thus, in the most interesting for real application working area around a focal point of a focusing lens the intensity distribution is characterized by the Gaussian function.

From one side, this Gaussian intensity distribution provides high energy concentration, especially when a laser beam is focused by a lens. However, from another side, for many scientific and industrial applications the Gaussian profile is not an optimum one because of non-uniform intensity distribution within a laser beam. In such laser applications like micromachining, engraving, scribing, drilling blind vias in PCB and many other applications, a uniform intensity profile of a beam is most preferable from the point of view of saving the energy and providing same conditions of material treatment by the laser radiation. For some laser applications, for example hole drilling, welding a donut or ring-shaped intensity distribution in the focal plane is a best choice.

Therefore, the task of re-distribution of energy within a focused laser beam to provide uniform, ring-shaped or other required intensity profiles is an actual industrial task; very often it is called beam shaping.

One of solutions used to transform the intensity distribution of focused laser beams is integrating beam shapers using arrays of microlenses, micromirrors, and or prisms to divide the source laser beam into small parts, beamlets; various implementations of this approach are described in Fred Dickey, et al., Laser Beam Shaping: Theory and Techniques, Marcel Dekker Inc., New York, 2000; and in WO/2005/085935 and U.S. Pat. No. 7,085,062. Light from all beamlets is then collected at a certain working plane by focusing with using additional optical components in such a way that each point of said working plane gets a portion of light from each beamlet. Thus, the final intensity of each point of working plane is defined by integration of light from all beamlets.

An obvious disadvantage of this integration approach is use of complicated, difficult to produce and expensive array optical elements. Another disadvantage of integration type systems is the strong speckle effect happening due to destroying the beam structure by splitting a beam, thus reducing its spatial coherence, and uncontrolled interference of light from multiple temporally coherent beamlets, this effect makes impossible to reliably create small focused beams of a size comparable with a wavelength of a beam, for example, of about 10 microns diameter in case of Nd:YAG or fiber lasers.

Another way of solving the problem is based on applying of diffractive optical elements (DOE) which have such a design that a beam passed through such an element provides uniform intensity in a certain location, examples of this method are presented in U.S. Pat. No. 5,864,430, U.S. Pat. No. 6,433,301, U.S. Pat. No. 6,791,060 and international patent application number WO/2007/034887. In case of applying the DOE the range of applications can be limited because of unacceptable diffraction losses and low resistance to high power laser beams.

One more approach is based on the well-known feature of a focusing lens to generate in its focal plane field amplitude proportional to Fourier-transform of the field amplitude function at the focusing lens input; this effect is sufficiently described by Joseph Goodman (Joseph W. Goodman Introduction to Fourier Optics, McGraw-Hill, New York, 1996) and in U.S. Pat. No. 6,975,458. Mathematical analysis on the base of diffraction theory shows that in order to get uniform intensity distribution of a spot in focal plane of a diffraction limited lens it is necessary to provide at the lens input the intensity distribution proportional to so called Airy disk, FIG. 2 described by function $[J_1(2\pi r)/(2\pi r)]^2$, where $J_1(2\pi r)$ is the first order Bessel-function of the first kind and r is the distance from the beam axis.

The approach illustrated by FIG. 3 and FIGS. 4a and 4b is described in U.S. Pat. No. 5,300,756, U.S. Pat. No. 6,639,177, U.S. Pat. No. 6,777,645, and U.S. Pat. No. 6,989,508 which implies creation of approximate to Airy disk intensity distribution from a laser beam by applying a binary phase plate 3 introducing a phase shift of half wavelength in a central region of an input Gaussian beam 1 and further focusing of that beam onto a target by means of a focusing lens 5. Because of this wavefront jump of half wavelength provided by the binary phase plate 3 the function of filed amplitude of the beam gets a jump as well, see FIG. 4a. The resulting field amplitude distribution approximates the Airy disk, but this approximation has evident disadvantages.

Due to the diffraction that the jumping wavefront shift leads to appearing in the final intensity distribution in the focal plane 6 of the focusing lens 5 not only a central spot but also sidelobes corresponding to $1^{st}$, $2^{nd}$ and higher orders of diffraction as shown in FIG. 4b. Those sidelobes "contain" relatively high amount of energy and, in most laser technologies, are either useless or bring an unwanted effect on a workpiece. This is, evidently, loss of costly laser energy that can reach essential values especially in case of high power lasers.

Another disadvantage of this technical solution is in sharp edges of material of the binary phase plate 3 on the border of the regions where this wavefront shift occurs. In the case of powerful lasers, those edges become zones of overheating and lead to destruction of the binary phase plate, this is especially critical in case of high peak power short pulse lasers.

Conventional technical solutions are aimed at providing a uniform or flattop intensity profile of a laser beam; but very often performance of laser technologies can be improved by applying other profiles. For example, the laser technologies of drilling holes would benefit from using a ring-like profile; the donut intensity distribution is optimum in some welding applications, this is, for example, taught by Peter Haglund, et al. (Peter Haglund, et al. Surface tension stabilized laser welding (donut laser welding)—A new laser welding technique, J. Laser Appl., Vol. 25, No. 3, May 2013, 031501-1). Therefore, providing of various intensity profiles by the same beam shaping optics would bring advantages and flexibility to laser technologies.

Thus, from the point of view of modern requirements of beam shaping optics for real laser applications, the conventional solutions are not optimal.

What is needed to solve the above problems is a highly efficient method and an apparatus of beam shaping of focused laser beams featuring by suppressed losses of laser energy and capable to provide uniform, ring-shaped, donut or other intensity distributions in a focal plane of a focusing lens and in the area near this focal plane.

SUMMARY OF THE INVENTION

A primary object of the present invention is to provide methods, systems, devices and apparatus for beam shaping of focused laser beams featuring by suppressed losses of laser energy and capable to provide uniform, ring-shaped, donut or other intensity distributions in a focal plane of a focusing lens and in the area near this focal plane.

A secondary object of the present invention is to provide methods, systems, devices and apparatus for beam shaping of focused laser beams by introducing a certain phase function in an input laser beam with using a phase transforming optical system, and further focusing the beam with using a focusing optical system.

Advantageously the introduced phase function can be described as a phase shift in the central region of the laser beam while the peripheral part of the beam does not have a change of a wavefront. This phase transformation function is characterized by a smooth transition of the phase between different regions of a beam; this provides optimum conditions for the beam shaping since the field amplitude and intensity distributions of a resulting beam, as shown in FIG. 6a, presents a close approximation to distributions corresponding to the Airy disk shown in FIG. 2.

It is known from the diffraction theory that focusing of a beam having the Airy disk intensity distribution provides a spot of uniform intensity in the focal plane of a lens, hence a similar result will be achieved with a beam, which intensity profile approximates the Airy disk intensity distribution. And the better this approximation is, the closer to uniform the resulting intensity profile of the spot in focal plane is, and the less beam energy is spread due to diffraction sidelobes of the resulting intensity distribution.

A third object of the present invention is to provide methods, systems, devices and apparatus for a phase shift in the central region of a beam of approximately equal to $\pi$ radian which corresponds to a wavefront shift of approximately one-half wavelength.

A fourth object of the present invention is to provide methods, systems, devices and apparatus for a phase shift in the central region of the beam with an approximate value in range between approximately $0.7\pi$ to approximately $0.9\pi$ radian. Reduction of the phase shift to a value less than $\pi$ radian compensates for deviation of the resulting intensity distribution in the focal spot from a pre-determined one; this deviation is caused by the deviation of intensity distribution of real $TEM_{00}$ laser beams from perfect Gaussian function, another reason is incomplete reproduction of the Airy disk function by the approximate function of intensity distribution.

Advantageously the method, system, device and the apparatus are applied with $TEM_{00}$ laser beams with cross-section intensity distribution described by the Gaussian function, shown in FIG. 1, or a similar function having peak intensity in the center of a beam and steadily decreasing of intensity towards the beam periphery. These intensity distributions are characteristic ones for most of $TEM_{00}$ laser sources with beam quality factors $M^2$ that do not exceed a value of approximately 1.5.

A fifth object of the present invention is to provide methods, systems, devices and apparatus for a round focused laser spot in the focal plane of the focusing optical system. This can be achieved when intensity distribution of the input laser beam and the introduced phase function have rotational symmetry.

A sixth object of the present invention is to provide methods, systems, devices and apparatus for a square-shaped focused laser spot in the focal plane of the focusing optical system. This can be achieved when intensity distribution of the input laser beam has rotational symmetry and the introduced phase function has square shape with rounded edges.

A seventh object of the present invention is to provide methods, systems, devices and apparatus for uniform intensity distribution of the laser spot in focal plane of the focusing optical system. Just this intensity distribution in the focal plane is most interesting for a variety of laser technologies.

An eighth object of the present invention is to provide methods, systems, devices and apparatus for a ring-shaped intensity distribution of the laser spot in focal plane of the focusing optical system and is described by a function having maximum value in spot periphery and zero value in its middle. Such beam profiles are important, for example, for laser technologies of drilling holes, in this case the laser energy is spent only in the area where material should be removed.

A ninth object of the present invention is to provide methods, systems, devices and apparatus for the intensity distribution of the laser spot in the focal plane of the focusing optical system described by a function with maximum value in the periphery of the beam and minimum value in middle of the said spot (donut hole). This intensity distribution can be called as "inverse-Gauss", it is optimum for laser welding, scribing.

The apparatus, device and system of the preferred but non-limiting embodiment of the present invention includes a phase transforming optical system to introduce in an input laser beam a phase shift function with a smooth transition of the phase shift between the central and peripheral regions of the beam, and a focusing optical system to focus the beam with the introduced phase function. The focusing optical system has positive dioptric power and contains at least one lens or at least one mirror and is a diffraction limited system implying that wave aberration in the entire working field is less than approximately $\lambda/4$, where $\lambda$ is a laser wavelength. The phase transforming optical system contains at least one optical surface with a shape such that a part of the surface protrudes above the remaining part of the surface, and the smooth transition between the parts of the surface is provided. Parameters of this protrusion are defined by a value of the introduced phase shift, laser wavelength, beam diameter and refractive index of optical material of optical elements of the phase transforming optical system. The protrusion of the surface corresponds to the central region of a laser beam that receives a phase shift with respect to the remaining peripheral region of the beam.

A tenth object of the present invention is to provide methods, systems, devices and apparatus having the phase transforming optical system in form of a plate made from glass or another refractive optical material and having at least one optical surface introducing the phase shift to a region of a beam due to the shape featuring a protrusion of a central region of this surface above the remaining peripheral part and by a smooth transition between the central and the peripheral parts of the surface.

An eleventh object of the present invention is to provide methods, systems, devices and apparatus having a phase transforming optical system in the form of a telescopic optical system with at least one lens fabricated from glass or another refractive optical material with an optical surface introducing the phase shift to a region of a beam due to the shape featured by a protrusion of the central region of this surface above the peripheral region and by an approximately smooth transition between the central and peripheral parts of the surface. Thus, a desired value of phase shift to a corresponding region of a beam is introduced by the optical surface. This embodiment makes it possible to combine a function of phase shift introduction with a function of beam expansion or de-magnifying. Magnification of the telescopic optical system can be either fixed or variable.

A twelfth object of the present invention is to provide methods, systems, devices and apparatus having a phase transforming optical system in the form of a collimator to transform a divergent laser beam to a collimated laser beam and having at least one lens made from glass or another refractive optical material with an optical surface introducing the phase shift to a region of a beam based on a shape featuring by a protrusion of a central part of this surface above the remaining peripheral part and by an approximately smooth transition between the central and peripheral parts of the surface. Thus, a desired value of phase shift to a corresponding region of a beam is introduced by the lens surface. This embodiment makes it possible to combine a function of phase shift introduction with a function of beam collimation that is very important for widely used fiber laser sources.

A thirteenth object of the present invention is to provide methods, systems, devices and apparatus with a phase transforming optical system and focusing optical system that are integrated in one optical system having at least one optical surface introducing the phase shift to a region of a beam due to the shape featuring by a protrusion of central part of the surface above the peripheral part and by a smooth transition between the central and peripheral parts of the surface. This embodiment makes it possible to combine the functions of phase shift introduction and beam focusing in one device to create a compact beam shaping solution.

Embodiments of the method and the apparatus realizing beam shaping of focused beams are described herein. In the following description, specific details are set forth to provide a thorough understanding of embodiments of the invention. One skilled in the relevant art will recognize, however, that the invention can be practiced without one or more of the specific details, or with other methods, components, materials, etc. In other words, well-known structures, materials, or operations are not shown or described in detail to avoid obscuring aspects of the invention.

Further objects and advantages of this invention will be apparent from the following detailed description of the presently preferred embodiments which are illustrated schematically in the accompanying drawings.

BRIEF DESCRIPTION OF THE DRAWINGS

The invention is illustrated, without limitation, by the accompanying drawings, which are briefly described below.

FIG. 3 is a schematic diagram showing the prior art beam shaping system on the base of the binary phase plate.

FIG. 4a is a graph showing distributions of normalized field amplitude and intensity of the beam after the binary phase plate in the beam shaping system of prior art shown in FIG. 3.

FIG. 4b is a graph showing intensity distribution of a focused beam with sidelobes in the focal plane of a focusing lens installed after the beam shaping system of prior art shown in FIG. 3.

DETAILED DESCRIPTION OF THE INVENTION

Figure 1:
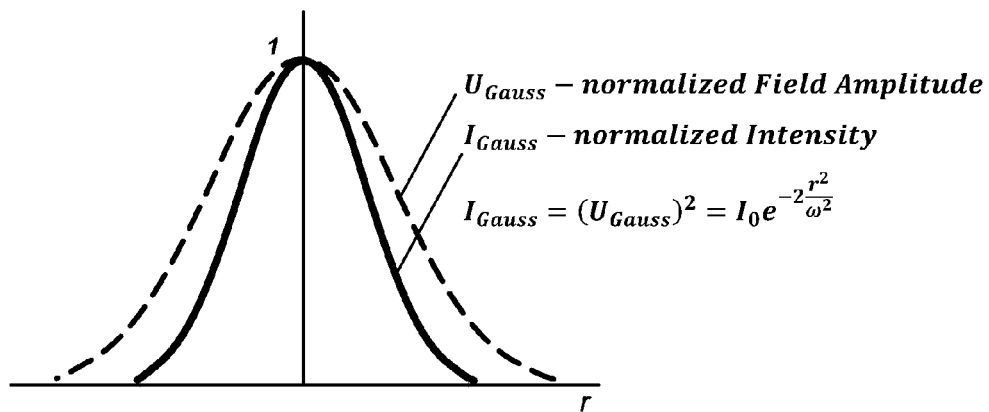
FIG. 1 shows the normalized intensity and field amplitude functions in a section of Gaussian beam corresponding to a perfect $TEM_{00}$ laser beam.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Figures and the various embodiments used to describe the principles of the present invention are by way of illustration and should not be construed in any way to limit the scope of the invention. Those skilled in the art will understand that the principles of the present invention may be implemented in a variety of laser devices.

The following is a list of reference numerals used in the description and the drawings to identify components:
1 input laser beam
2 input wavefront
3 binary phase plate
4 wavefront with step-wise phase shift
5 focusing lens
6 focal plane
7 phase transforming optical system
8 output wavefront
9 optical component with at least one aspherical optical surface
10 two component telescopic optical system
11 lens
12 optical component having an aspherical optical surface
13 three component zoom telescopic optical system
14 lens
15 optical component having an aspherical optical surface, phase shift optical surface
16 lens
18 focusing optical system, two basic conditions including 1) it should be diffraction limited, this means the wave aberration of the system to be less than quarter of wavelength in whole working field, and 2) it should have positive dioptric power.
19 collimating optical system including at least one optical surface introducing a phase shift, integrating the beam shaping and collimation in one device; can be one lens or multi lens
20 multi lens collimating optical system, at least one phase shift introducing optical surface; beam shaping and collimation integrated in one device
21 lens
22 optical component having an aspherical optical surface
23 lens
24 integrated optical system providing simultaneously functions of beam shaping and focusing According to the present invention there are realized various optical systems for creating intensity distributions in a focal plane of a focusing lens required in particular laser applications. The method according to present invention is based on the well-known feature of a lens, or any focusing optical system, to create in its focal plane a field amplitude distribution proportional to the Fourier transform of a field amplitude distribution of a beam at the input aperture of the said lens or said focusing optical system. This effect is sufficiently described by Joseph Goodman (Joseph W. Goodman Introduction to Fourier Optics, McGraw-Hill, New York, 1996) and in U.S. Pat. No. 6,975,458. Summarizing analytical considerations concerning the Fourier transform by an optical system of circular symmetry one can express, in polar coordinates, the field amplitude distribution $U_f$ in the focal plane of a focusing optical system by the formula $$U_f(\rho) = B\int_0^\infty U_{in}(r) J_0(2\pi\rho r) r\, dr \quad (1)$$

where
$U_{in}$ is a field amplitude at the input aperture of the focusing optical system,
$\rho$ is polar radius inside laser spot in focal plane of the focusing optical system,
$r$ is polar radius on input aperture of the focusing optical system,
$J_0$ is zero order Bessel-function of the first kind; and
B is a constant.

This expression is accordingly referred to as the Fourier-Bessel transform, or alternatively as the Hankel transform of zero order.

In a majority of laser technologies a result of laser radiation interaction with material is determined by the intensity distribution. In practice the intensity distribution $I_f$ in the focal plane of the focusing optical system can be expressed by relationship $$I_f(\rho) = [U_f(\rho)]^2 \quad (2)$$

Intensity re-distribution could be realized for various light beams, however most often in the practice it is necessary to transform $TEM_{00}$ laser beams, which intensity distribution is described by Gaussian function (these beams are often called as Gaussian beams), to beams of uniform intensity also called as flattop or top hat. Accordingly, without limitation of the essence of invention, the intensity distributions in cross-section of input beam $I_{in}$ and the cross-section of the laser spot in focal plane of the focusing optical system $I_f$ can be defined as $$I_{in}(r) = I_{in0} e^{-2r^2/\omega^2} \quad (3)$$

$$I_f(\rho) = \begin{cases} I_{f0} & \text{for } \rho \leq \rho_{max} \\ 0 & \text{for } \rho > \rho_{max} \end{cases} \quad (4)$$

where $\omega$ is a waist radius of the Gaussian beam, $\rho_{max}$ is radius of uniform spot, $I_{in0}$ and $I_{f0}$ are constants. The expression (4) is also referred to as the circ function.

In addition to Gaussian laser beams, the beam shaping optical systems according to the present invention can operate with other $TEM_{00}$ beams in which the cross-section intensity distribution is described by Gaussian-like functions having peak intensity in the beam center and steadily decreasing in intensity towards the beam periphery. As non-limiting examples of such Gaussian-like functions are supergaussian functions described as $$I_{in}(r) = I_{in0} e^{-2(r/\omega)^m} \quad (5)$$

where $2 < m < 10$;

or parabolic functions, for example $$I_{in}(r) = I_{in0}\left(1 - \frac{r^2}{r_{in}^2}\right) \quad (6)$$

where $r_{in}$ is maximum beam radius.

Figure 2:
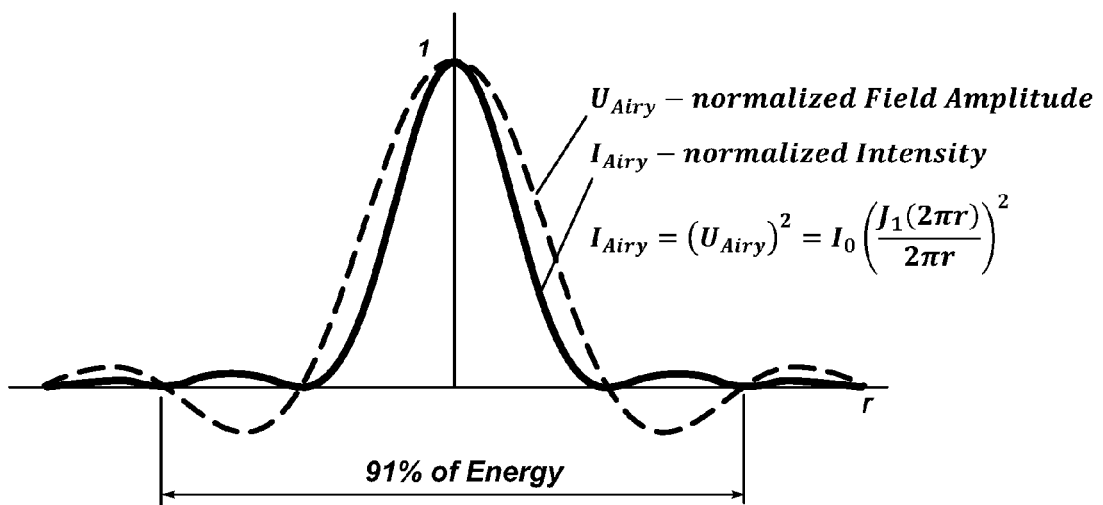
FIG. 2 shows the normalized intensity and field amplitude functions in a section of the Airy Disk which intensity is described by the function $[J_1(2\pi r)/(2\pi r)]^2$, where $J_1(2\pi r)$ is the first order Bessel-function of the first kind and r is the distance from the beam axis.

When focusing a round light beam having uniform intensity by a diffraction limited lens, the field amplitude in its focal plane is described by a function being proportional to $J_1(2\pi r)/(2\pi r)$, where $J_1(2\pi r)$ is the first order Bessel-function of the first kind and r is the distance from the beam axis, and the intensity distribution is proportional to $[J_1(2\pi r)/(2\pi r)]^2$, this distribution is called as Airy disk, see FIG. 2. Mathematical analysis based on the diffraction theory described by Joseph Goodman (Joseph W. Goodman Introduction to Fourier Optics, McGraw-Hill, New York, 1996) shows that in order to get uniform intensity distribution of a spot in the focal plane of a diffraction limited lens it is necessary to provide at the lens input the field amplitude and intensity distributions proportional to ones of Airy disk. The Hankel transform of the function $J_1(2\pi r)/(2\pi r)$ is proportional to a function that is characterized by uniform value within a circle of definite radius. Since the resulting field amplitude distribution in the focal plane of a lens is proportional to the Hankel transform of a field amplitude distribution at the lens input, the resulting field amplitude is constant (uniform) within a circle defined by a spot size. Then, according to equation (2) the intensity distribution within the spot is uniform as well.

An essential feature of the described solution is that the Airy disk intensity distribution presents an infinite function. This means a focusing optical system needs to have infinite entrance aperture that is impossible in practice. On the other hand most of the real applications don't require exact uniform intensity of the focused spot, their performance can be improved drastically even with approximation of uniform profile. Therefore, acceptable technical solutions for many scientific and industrial tasks can be realized by providing at the entrance of the focusing optical system a beam which intensity distribution approximates the Airy disk intensity distribution. According to calculations for the Airy disk intensity distribution, 91% of the energy is concentrated in the beam portion containing the central spot and first ring of intensity distribution, see FIG. 2. And approximation of just that portion of Airy disk allows optimizing conditions of interference in focal plane and provides sufficient approximation of uniform intensity distribution in focal spot for most laser applications.

An attempt to realize this approach by using a binary phase plate is presented in the prior art solution shown in FIG. 3 and described in U.S. Pat. No. 5,300,756, No. 6,989,508, No. 6,777,645. Due to sharp edges of that binary phase plate there is realized an unsatisfactory approximation of the Airy disk distribution as shown in FIG. 4a, which results in inherent disadvantages of that solution such as essential energy losses in sidelobes as shown in FIG. 4b, and low resistance to high powerful laser beams. To overcome those disadvantages and provide a reliable tool for efficient beam shaping of laser beams the method and apparatus according to the present invention was developed.

Figure 5:
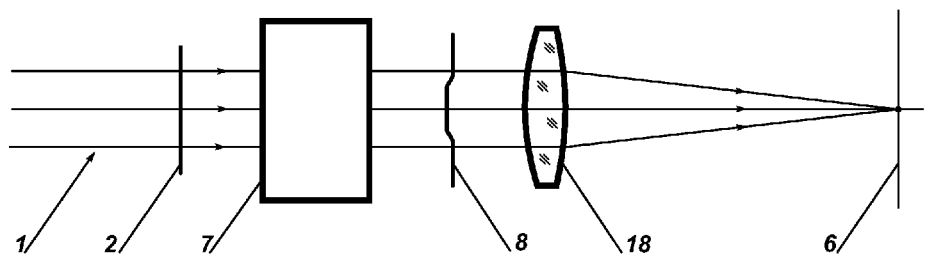
FIG. 5 shows the basic structure of the beam shaping system with smooth function of the phase shift transition realizing the method according to the present invention.

As shown in FIG. 1 and FIG. 2, the central portions of the field amplitude distributions of Gaussian and Airy disk beams are similar; this is also valid for intensity distributions. Hence a considerable central portion of the Airy disk can be approximated by the corresponding central portion of the Gaussian beam. It is suggested to approximate other parts of the Airy disk, containing the first ring of intensity distribution, by a beam shaping system which basic structure is shown in FIG. 5. A phase transforming optical system 7 introduces a phase function with a smooth transition in the laser beam 1 in such a way that an input wavefront 2 of the laser beam 1 is transformed to an output wavefront 8, the transformed beam is then focused by a focusing optical system 18, and a resulting intensity distribution is created in focal plane 6 or in an area close to this focal plane 6 of the focusing optical system 18. Advantageously the introduced phase function can be described as a phase shift, or phase retardation, in the central region of the laser beam while the wavefront of the rest peripheral region of that beam is left unchanged.

Figure 6A:
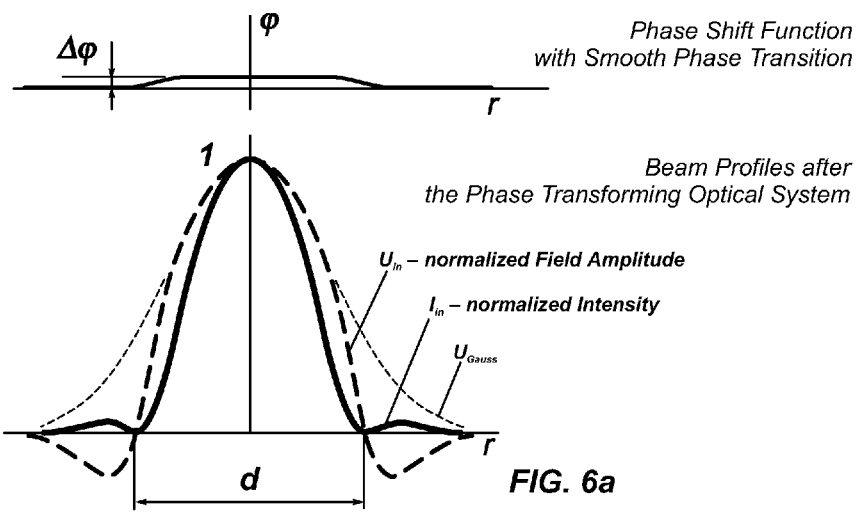
FIG. 6a is a graph showing distributions of normalized field amplitude and intensity of the beam after the phase transforming by the optical system shown in FIG. 5, according to the method of the present invention.

A very important feature of the method and apparatuses according to present invention is a smooth transition of the phase between different regions of the beam. Comparison of the graphs shown in FIG. 2 and FIG. 6a show that the smooth transition of the phase shift function provides a more precise approximation of the field amplitude and intensity distributions of the Airy disk, and hence, optimum conditions for creating a pre-determined intensity distribution in the focal plane 6 of the focusing optical system 18. An important advantage of this smooth phase shift transition is in essential suppressing of sidelobes hat appear due to diffraction in the resulting intensity distribution in the focal plane 6; this leads to more effective use of costly laser energy and prevents undesirable effects of material processing caused by the sidelobes.

The method and apparatuses according to present invention create round and square shaped focused laser spot in the focal plane of the focusing optical system. The shape of the focused laser spot depends on the shape of the phase shift function in plane perpendicular to the optical axis. When both intensity distribution of the input laser beam and the introduced phase function have rotational symmetry the resulting focused spot is round. When intensity distribution of the input laser beam has rotational symmetry and the introduced phase function has square shape with rounded edges the resulting focused spot has square shape. Selection of an optimum shape of a focused spot depends on the particular laser application.

To realize the smooth transition phase shift function it is suggested to apply in the said phase transforming optical system 7 an optical component like a lens, or a mirror, or a plate, or any other optical element with an aspherical optical surface with such a shape that a part of the surface protrudes above the rest part of the said surface, and smooth transition between the said parts of the surface is provided. Parameters of this protrusion are defined by a value of the introduced phase shift $\Delta\phi$, laser wavelength, beam diameter and refractive index of optical material of optical elements of the said phase transforming optical system. Advantageously the shape of that aspherical optical surface is designed in such a way that the central part of the surface either protrudes above or is lower than the peripheral surface part, and the smooth transition zone between the central and peripheral parts of the surface has certain width. Dimensions of a central line of the transition zone—diameter in case of generation round spot and square side in case of generation square shaped spot—correspond to size of the region of a laser beam 1 that gets a phase shift over the rest region of the said beam. Advantageously, when the transition zone is round the radius of its central line is equal to the waist radius of the laser beam 1 at $1/e^2$ intensity level. When the transition zone has square shape the length of the side of a square is equal to the waist radius of the laser beam 1 at $1/e^2$ intensity level. In order to provide various resulting intensity profiles in the focal spot shown in FIGS. 6b through 6e, either dimensions of the central line of the transition zone or the waist radius of a laser beam 1 is varied.

An important positive effect from smoothness of the phase shift introduced by the optical surface is its high resistance to high peak power laser energy. In contrary to other prior art mentioned technical solutions on the base of binary phase plates, the method according to present invention implies use of smooth optical surfaces without any scratches or sharp edges that are usually a sources of optics damage due to concentration of mechanical stresses and overheating when high peak power laser energy is applied. Therefore, the optical systems according to present invention provide essentially higher damage thresholds compared to diffractive optical elements, binary phase plates, and multilens optical components used in other beam shaping systems; this feature is especially important when using modern short-pulse lasers.

As a non-limiting example of the described surface one can present an aspherical surface in which sag z can be defined as $$z = \frac{P\lambda}{z(n-1)} e^{-(h/d)^q} \qquad (7)$$

where $15<q<25$, r is a height on the aspherical surface, having sense of radius in polar coordinates, where
d is a diameter of the circular central portion of a beam where a phase shift is introduced,
n is refractive index of the material of the said optical element containing the said aspherical surface,
$\lambda$ is wavelength,
P is constant parameter defining a value of phase shift, when P=1 the phase shift is equal to $\pi$, and wavefront shift is $\lambda/2$. This is an aspherical surface characterized by flat areas around an apex and surface periphery with a smooth transition between the apex and periphery areas.

Modern optics manufacturing technologies provide capabilities to realize various shapes of aspherical surfaces including convex or concave surfaces, as well as the surfaces with a flat central region. And these technologies can be applied to manufacture the optical components required to realize the method according to present invention.

A choice of the value of the phase shift to be introduced by the phase transforming optical system 7 depends on a particular wavelength of a laser beam 1 and resulting intensity distribution in focal plane 6 of the focusing optical system 18. When the phase shift $\Delta\phi$ is equal to r radian the wavefront shift is equal to approximately $\lambda/2$ that is optimum for theoretical transformation of a beam with an Airy disk intensity distribution to a focal spot with uniform intensity. The method according to present invention provides approximation of Airy disk distribution, on the other hand intensity distribution of real $TEM_{00}$ laser beams deviates from perfect Gaussian function; as a result there exists certain deviation of the resulting intensity distribution in the focal plane 6 from uniform one. Compensation of this deviation is achieved through optimization of design parameters of a particular phase transforming optical system 7 in such a way that the introduced phase shift $\Delta\phi$ is less than $\pi$ radian, advantageously in range $0.7\pi<\Delta\phi<0.9\pi$.

Figure 6B:
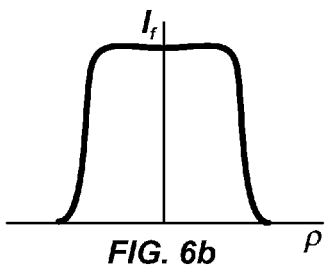
FIG. 6b is a graph showing uniform intensity distribution in a spot of a focused beam in the focal plane of the focusing optical system shown in FIG. 5 installed after the phase transforming optical system according to the method of the present invention.
Figure 6C:
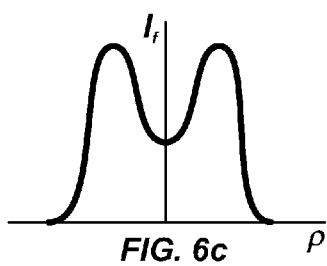
FIG. 6c is a graph showing intensity distribution with a minimum in the middle of a spot of the focused beam in the focal plane of the focusing optical system shown in FIG. 5 according to the method of the present invention.
Figure 6D:
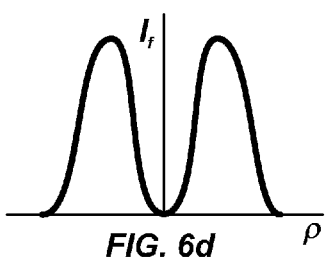
FIG. 6d is a graph showing intensity distribution with zero intensity in the middle of a spot of the focused beam in the focal plane of a focusing optical system shown in FIG. 5 according to the method of the present invention.
Figure 6E:
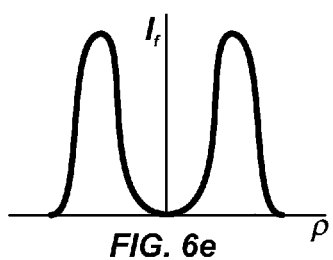
FIG. 6e is a graph showing ring-like intensity distribution of a spot of the focused beam in the focal plane by a focusing optical system shown in FIG. 5 according to the method of the present invention.

A variety of laser applications dictates a variety of the required intensity distributions in focal spot. Most often just an uniform distribution of a spot as shown in FIG. 6b is needed; however, often the performance of laser technologies can be improved by applying ring-like distributions as shown in FIG. 6e, or by so called inverse-Gauss or donut distributions with steep edges and reduction of intensity in the center of a beam as shown in FIG. 6c and FIG. 6d. All these mentioned intensity distributions can be realized by the method according to present invention by selecting a suitable combination of parameters of the phase transforming optical system 7: working wavelength, value of phase shift $\Delta\phi$, size of transition zone and its correspondence to waist radius of a laser beam 1, optical characteristics of material applied in optical elements. For example, a simple increase of laser beam diameter on the surface introduces the phase shift leading transformation of the profile shown in FIG. 6b to the profile shown in FIG. 6c. Optimization of the parameters is, usually, a part of designing of a particular beam shaping system.

The method according to the present invention implies that the beam transformed by the phase transforming optical system 7 be focused by a focusing optical system 18, and the resulting intensity distribution is created in focal plane 6 or in area close to the said focal plane of this focusing optical system 18. There are only two basic conditions for the focusing optical system 18: 1) it should be diffraction limited, this means the wave aberration of the system to be less than quarter of wavelength in whole working field, and 2) it should have positive dioptric power. The last condition means that any refractive, or reflective, or catadioptric, or diffractive optical objective can be applied. Without limitations, the method according to the present invention can be realized with micro objective, F-$\Theta$ or telecentric lenses, then the focusing optical system 18 can contain such optical components like scanning mirrors, prisms, beam-expanders; with using high magnification microscope objective lenses as a focusing optical system 18 it is possible to create flattop laser spots of a few microns diameter. In other words the method according to present invention gives flexibility in choosing of suitable focusing optics.

An important advantage of the method according to present invention is in high efficiency of using of costly laser radiation due to low energy losses while transforming of the intensity distribution.

The method according to the present invention can be realized by various optical systems, several embodiments will now be described.

A common feature of embodiments of the present invention is that at least one of optical components contains an aspherical optical surface with such a shape that central part of the surface either protrudes above or is lowered below the rest peripheral part of the said surface, and smooth transition between the said parts of the surface is provided. Basic approaches of designing of this aspherical surface were considered in above description.

Figure 7:
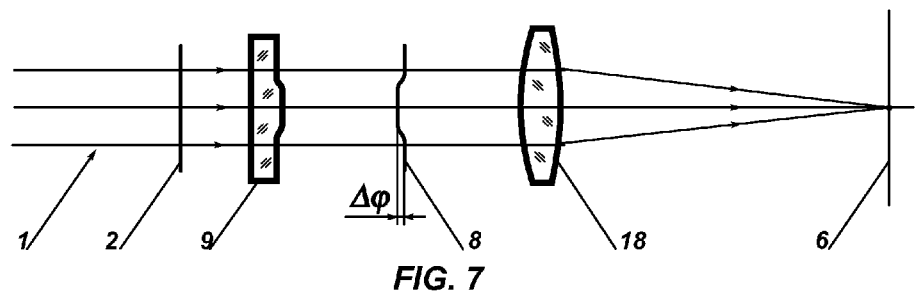
FIG. 7 is a schematic drawing of the beam shaping system according to one embodiment of the present invention with a phase transforming optical system implemented as a phase plate introducing a phase shift function with a smooth transition.

According to one, non-limiting, embodiment of the present invention, depicted in FIG. 7, the apparatus has the phase transforming optical system in form of a plate 9 being made of glass or another refractive optical material and having at least one said phase shift introducing aspherical surface. This is a simplest way to introduce a required value of phase shift to a laser beam and it works successfully when laser beams of fixed size are used. According to the method of present invention the focusing optical system 18 to be installed after that phase shift introducing plate 9; resulting intensity distribution is created in focal plane 6 of the focusing optical system 18.

Figure 8:
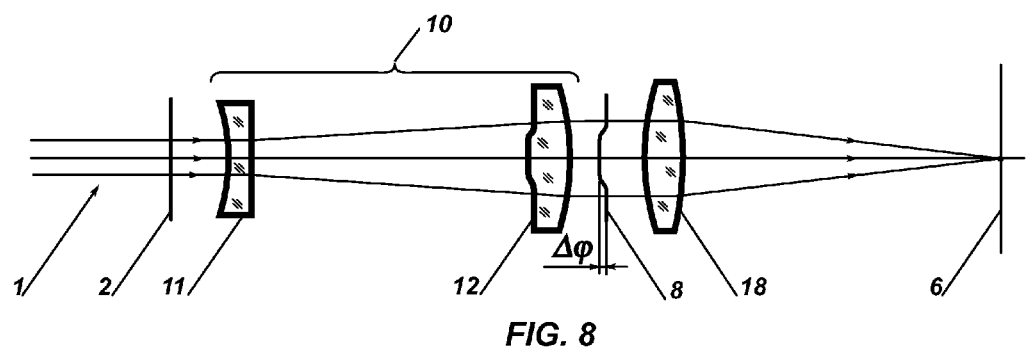
FIG. 8 is a schematic drawing of the beam shaping system according to another embodiment of the present invention with a phase transforming optical system implemented as a two component telescope introducing a phase shift function with smooth transition.

Very often in practice, the size of a laser beam differs from an optimum one, for example diameters of laser beams of $2^{nd}$ or $3^{rd}$ harmonics of Nd:YAG are usually smaller than 1 mm due to features of non-linear conversion realized in those lasers. At the same time, preferable sizes of the phase shift introducing optical elements are in a range of several millimeters or centimeters, this is dictated by capabilities of modern optical manufacturing technologies. To optimize conditions for the method according to present invention, it is necessary to correct the laser beam size. As a solution, the present invention shown in FIG. 8 is an apparatus including a phase transforming optical system in form of a telescopic optical system 10 from two lens components and having at least one component 12 with a phase shift introducing optical surface. In this embodiment there are combined in one device functions of phase shift introduction and beam expansion or de-magnifying. The focusing optical system 18 can be installed after that telescope optical system 10; resulting in creating intensity distribution in focal plane 6 of the focusing optical system 18.

Figure 9:
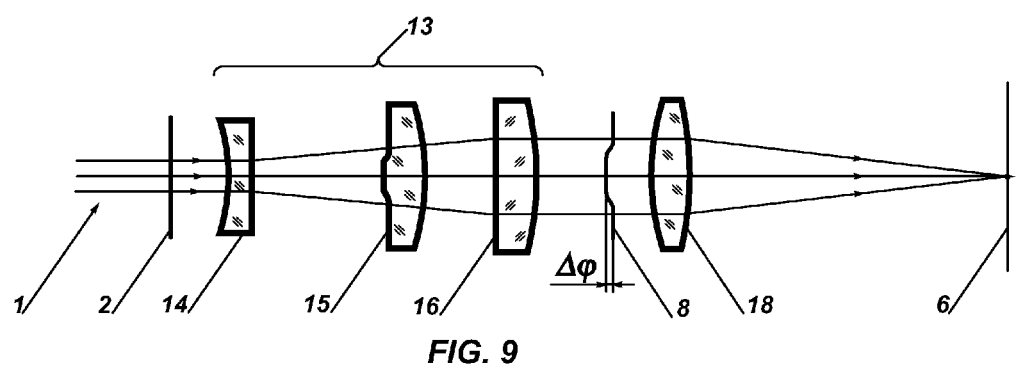
FIG. 9 is a schematic drawing of the beam shaping system according to one more embodiment of the present invention with a phase transforming optical system implemented as a three component zoom telescope introducing a phase shift function with a smooth transition.

To expand capabilities of a beam shaping system, FIG. 9 shows an apparatus including a phase transforming optical system in form of a zoom telescopic optical system 13 using three lens components and having at least one optical component 15 with a phase shift introducing optical surface. Optical design of this three component telescope 13 is realized in such a way that it enables variable magnification and, hence, to vary a beam size on the phase shift introducing optical surface of the optical component 15. Variation of the magnification is realized by moving the lens components, for example, non-limiting, the lenses 15 and 16. Consequently, this function provides the possibility to vary the resulting intensity distribution in the focal plane 6 of the focusing optical system 18 and realize various intensity distributions, shown in FIG. 6b-6e, in focal plane 6 of the focusing optical system 18 by the same optical device. Like in previous embodiments of present invention the focusing optical system 18 is installed after the zoom telescope optical system 13.

Figure 10:
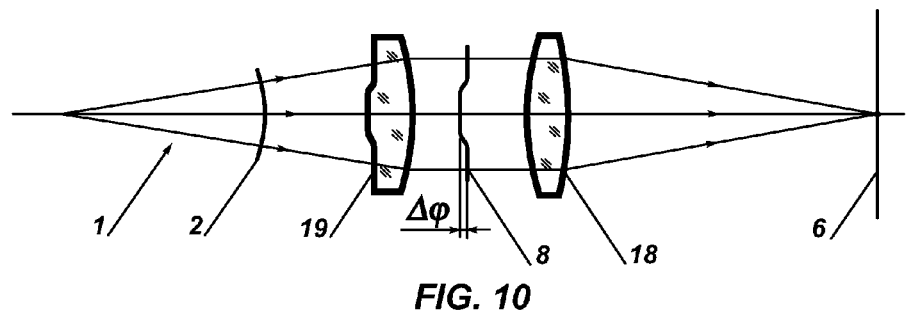
FIG. 10 is a schematic drawing of the beam shaping system according to the embodiment of the present invention with a phase transforming optical system implemented as a collimator containing at least one lens and introducing a phase shift function with a smooth transition.

The beam shaping system shown in FIG. 10 is intended to be used with fiber lasers or fiber coupled $TEM_{00}$ lasers which radiation is featured by essential divergence. The apparatus has the phase transforming optical system in form of a collimating optical system 19 having at least one optical surface introducing a phase shift, thus the functions of beam shaping and collimation are integrated in one device. Without limitations, the collimating optical system 19 can be realized as a single lens or as a multilens optical system and transforms essentially divergent input laser beam to collimated low divergent laser beam with introduced smooth transition phase shift function. The focusing optical system 18 to be installed after that collimating optical system 19; resulting intensity distribution is created in focal plane 6 of the focusing optical system 18.

Figure 11:
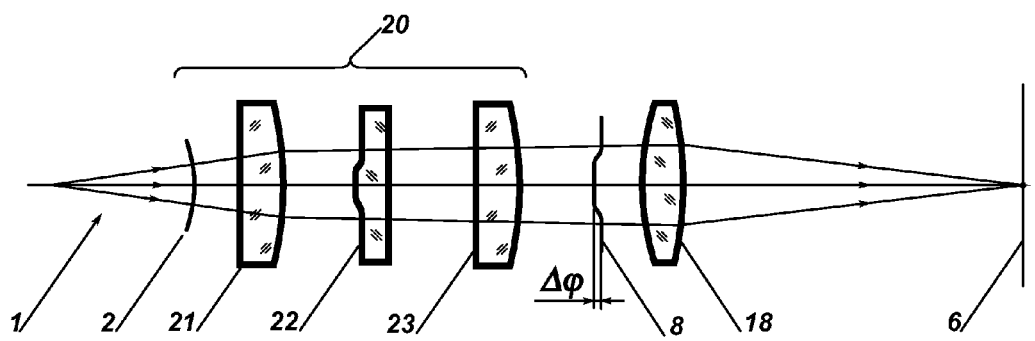
FIG. 11 is a schematic drawing of the beam shaping system according to another embodiment of the present invention with a phase transforming optical system implemented as a multi lens collimator with variable focal length and introducing a phase shift function with smooth transition.

To provide easy adaptation of the beam shaping system to real fiber or fiber coupled lasers with essential divergence, FIG. 11 shows the apparatus including the phase transforming optical system in the form of a multilens collimating optical system 20 having at least one optical surface introducing a phase shift, thus the functions of beam shaping and collimation are integrated in one device. Optical design of this multilens collimator 20 is configured such that it enables a variable beam size on the phase shift introducing optical surface through moving the lens components, for example, non-limiting, the lenses 22 and 21. Consequently, it is provided variation of the resulting intensity distribution in the focal plane 6 of the focusing optical system 18 and various intensity distributions, shown in FIG. 6b-6e, are realized in the focal plane 6 of the focusing optical system 18. The focusing optical system 18 can be installed after that collimating optical system 20 resulting in creating an intensity distribution in the focal plane 6 of the focusing optical system 18.

Figure 12:
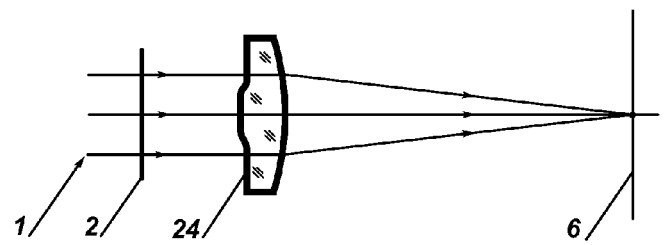
FIG. 12 is a schematic drawing of the beam shaping system according to the embodiment of the present invention implemented as an integrated optical system, realizing simultaneously the functions of phase shift introduction and beam focusing, with an optical surface introducing a phase shift function with smooth transition.

Another, non-limiting, embodiment of present invention shown in FIG. 12 implies that the phase shift introduction can be provided by one optical surfaces of the focusing optical system, thus there is realized an integrated optical system 24 providing simultaneously functions of beam shaping and focusing. This embodiment realizes a compact solution that is very convenient to use in plenty of industrial and scientific laser applications, which is one more important advantage of apparatuses realizing the method of present invention.

An essential advantage of the apparatuses realizing the method according to present invention is that the beam shaping apparatuses are implemented in such a way that by variation of their internal parameters it is possible to adapt them to real laser beams of different sizes, as well as to vary the resulting intensity distribution and to provide uniform and other distributions shown in FIG. 6b-6e. Therefore, the presented apparatuses enable to combine in one beam shaping optical device adaptation to real laser conditions and variation of resulting intensity profile. This makes the apparatuses, developed according to present invention, very convenient to use and a flexible tool.

The invention being thus described may be varied in many ways. Such variations are not to be considered as a departure from the spirit and scope of the invention. For example, the phase transforming optical system can consist of more than three lenses, or can be implemented as a collimating optical system. All such modifications as would be obvious to one skilled in the art are intended to be included within the scope of the following claims.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for shaping a focused laser beam comprising the steps of:
    introducing a phase function to an input beam using a phase transforming optical system to phase shift a central region of the input beam via the phase transforming optical system without changing a wavefront for a peripheral region of the input beam while providing a smooth function of transition of the phase shift between the central region and the peripheral region of the input beam to provide a beam phase distribution and intensity distribution of a bright central region and a first ring of an Airy disk beam; and
    focusing the phase transformed beam using a focusing optical system to produce in a focal plane of a focusing optical system a focal spot that reproduces an intensity distribution proportional to a square of a Hankel Transform of a two dimensional electric field amplitude distribution of said phase transformed beam.

2. The method according to claim 1, wherein the phase function introduction step comprises the step of:
    phase shifting of the central region of the input beam for a phase shift with a value being equal to $\pi$ radian.

3. The method according to claim 1, wherein the phase function introduction step comprises the step of:
    phase shifting the central region of the input beam for a phase shift with a value in a range between approximately $0.7\pi$ to approximately $0.9\pi$ radian.

4. The method according to claim 1, further comprising the step of:

providing an input laser beam having $TEM_{00}$ mode and an intensity distribution is described by a supergaussian function $$I_{in}(r)=I_{in0}e^{-2(r/\omega)^m}$$

where $2<m<10$, $\omega$ is a waist radius of the Gaussian beam, r is radius, and $I_{in0}$ is constant.

5. The method according to claim 1, wherein the focusing step produces a round focused laser spot at the focal plane of the focusing optical system.

6. The method according to claim 1, wherein the focusing step produces a square shaped focused laser spot at the focal plane of the focusing optical system.

7. The method according to claim 1, wherein the focusing step produces an intensity distribution of the focused laser spot in the focal plane of the focusing optical system having a ring shape described by a function having a zero value in the center and maximum value at a periphery of the spot.

8. The method according to claim 1, wherein the focusing step produces a round focused laser spot having a ring shape described by a function having a zero value in the center and maximum value at a periphery of the spot.

9. The method according to claim 1, wherein the focusing step produces an intensity distribution of the focused laser spot in the focal plane of the focusing optical system described by a function having minimum value in a center and maximum value in a periphery of the spot.

10. The method according to claim 1, wherein the focusing step produces a round focused laser spot having a ring shape described by a function having a minimum non zero value in the center and maximum value at a periphery of the spot.

11. An apparatus for shaping a focused laser beam comprising:

a phase transforming optical system to introduce a phase shift function in an input beam with smooth transition of phase shift between central region and peripheral region of the input beam to provide a beam phase distribution and intensity distribution of a bright central region and a first ring of an Airy disk beam, and in a focal plane of a focusing optical system a focal spot that reproduces an intensity distribution proportional to a square of a Hankel Transform of a two dimensional electric field amplitude distribution of said phase transformed beam a focusing optical system which has an intensity distribution that is proportional to a square of a Hankel Transform of a two dimensional electric field amplitude of said phase transformed beam.

12. The apparatus according to claim 11, wherein the focusing optical system has a positive dioptric power and contains at least one lens or at least one mirror.

13. The apparatus according to claim 11, wherein the focusing optical system is diffraction limited.

14. The apparatus according to claim 11, wherein the phase transforming optical system contains at least one optical surface with a shape having a first region of the surface protruding above a remaining region of the said surface and a value of this protrusion is defined according to the introduced phase shift, and a smooth transition between the said first region and the remaining region of the surface.

15. The apparatus according to claim 11, wherein the phase transforming optical system includes a plate fabricated of glass or another refractive optical material and having at least one optical surface introducing the phase shift to a region of a beam.

16. The apparatus according to claim 11, wherein the phase transforming optical system presents a telescope having at least one lens with an optical surface introducing the phase shift to a region of an input beam.

17. The apparatus according to claim 11, wherein the phase transforming optical system comprises:

a collimator transforming a divergent laser beam to a collimated laser beam and having at least one lens with an optical surface introducing the phase shift to a region of the input beam.

* * * * *